United States Patent
Ngo (10) Patent No.: US 6,629,783 B2
(45) Date of Patent: Oct. 7, 2003

(54) FIBER OPTIC CABLE GUIDE BOOT

(75) Inventor: Hung Viet Ngo, Harrisburg, PA (US)

(73) Assignee: FCI Americas Technology, Inc., Reno, NV (US)

( * ) Notice: Subject to any disclaimer, the term of this patent is extended or adjusted under 35 U.S.C. 154(b) by 0 days.

(21) Appl. No.: 09/900,006

(22) Filed: Jul. 6, 2001

(65) Prior Publication Data

US 2003/0007744 A1 Jan. 9, 2003

(51) Int. Cl.[7] ................................................. G02B 6/36
(52) U.S. Cl. ............................................. 385/86; 385/76
(58) Field of Search ............................... 385/86, 76, 77

(56) References Cited

U.S. PATENT DOCUMENTS

| | | | |
|---|---|---|---|
| 4,439,005 A | * 3/1984 | Winzer | 385/52 |
| 5,073,044 A | 12/1991 | Egner et al. | 385/86 |
| 5,138,678 A | 8/1992 | Briggs et al. | 385/86 |
| 5,347,603 A | 9/1994 | Belenkiy et al. | 385/86 |
| 5,390,272 A | 2/1995 | Repta et al. | 385/100 |
| 5,530,787 A | 6/1996 | Arnett | 385/137 |
| 5,570,443 A | 10/1996 | May et al. | 385/75 |
| 5,640,476 A | 6/1997 | Womack et al. | 385/86 |
| 5,710,851 A | 1/1998 | Walter et al. | 385/86 |
| 5,781,681 A | 7/1998 | Manning | 385/86 |
| 5,892,871 A | 4/1999 | Dahan et al. | 385/86 |
| 5,933,557 A | 8/1999 | Ott | 385/86 |
| 6,019,521 A | 2/2000 | Manning et al. | 385/77 |
| 6,130,983 A | 10/2000 | Cheng | 385/139 |
| 6,134,370 A | 10/2000 | Childers et al. | 385/135 |

OTHER PUBLICATIONS

Product Information, "Corning® 62.5/125 CPC6 Multimode Optical Fiber", 1996, 1 page.
Product Information, "Corning® 50/125 CPC6 Multimode Optical Fiber", 1996, 1 page.

* cited by examiner

Primary Examiner—Michael C. Zarroli
(74) Attorney, Agent, or Firm—Woodcock Washburn LLP (57) ABSTRACT

A single-piece guide boot for a fiber optic ribbon cable includes an angled section and a straight section or termination plug. The guide boot comprises an outer sleeve or body that defines an inner passageway, and has a first end for receiving the cable and a termination port. The inner passageway is dimensioned to allow a user to insert a cable through the passageway. The body with the inner passageway is used for guiding, bending, and/or twisting the cable. The body is angled at the desired angle (or radius of curvature), such as about 45 degrees or about 90 degrees. The body could have an outer diameter that decreases toward the first end. The inner passageway could be tapered to allow the cable to twist along the length of the boot without interference. The cable is inserted into the guide boot and through a cut-out window, at which time it is twisted or otherwise rotated. The cable is then re-inserted through the window and through the termination port of the termination plug.

20 Claims, 6 Drawing Sheets

FIG. 6

FIBER OPTIC CABLE GUIDE BOOT

FIELD OF THE INVENTION

The present invention relates in general to fiber optic cable or ribbon connectors, and more particularly, the present invention relates to a guide boot for fiber optic cables that allows a fiber optic cable to be bent, twisted or rotated without damaging the optical fiber in the cable or affecting signal quality.

BACKGROUND OF THE INVENTION

Optical fibers are used in a variety of applications ranging from large scale telephonic communication systems to laser surgery, and generally include a transparent core made, for example, of glass surrounded by cladding which is also made of transparent material but has a different index of refraction than the core. The core and cladding are enclosed by a protective flexible jacket. Connectors are used to join fibers to each other and to active or passive optical components such as sources, detectors, repeaters, switches, and attenuators.

As is well known in fiber optics, bending or twisting fiber optic cable too sharply can lead to a reduction in the signal transmission quality of the cable. However, it is necessary to be able to bend fiber optic cables in order to route the cables within, to and from equipment such as computers, connector panels, junctions boxes, etc. Accordingly, fiber optic cables are evaluated to determine a minimum bend radius. As long as a fiber optic cable is bent at a radius that is equal to or greater than the minimum bend radius, there should be no reduction in the transmission quality of the cable. However, if a fiber optic cable is bent at a radius below the minimum bend radius determined for such cable, there is a potential for a reduction in signal transmission quality through the bend.

The process of terminating the fiber optic cable in a connector is commonly referred to as "connectorization." The point at which a fiber optic cable extends into a connector joined on the end of the cable is an especially susceptible point of the cable bending below the minimum bend radius of the cable. To prevent such unacceptable bending, it is well known to install reinforcing boots during connectorization that extend out from the connector and encase a length of the cable extending from the connector. Such boots are permanently installed during connectorization. These boots provide enough reinforcement to limit the bend radius of the cable at the cable/connector junction.

However, there are problems in relying merely on reinforcing boots to prevent excessive bending of the fiber optic cable. For example, hundreds of fiber optic cables are commonly routed through and connected in connector panels or junction boxes with limited space. The connectors of such fiber optic cables are commonly inserted into horizontally oriented connectors that are arranged in a vertical panel in the junction box. The cables are routed in a direction perpendicular to their connector. The door of such junction boxes is also vertical and typically closes in a plane parallel to the panel of connectors. The space between the closed door and the panel of connectors is desired to be as small as possible; however, if the space is too small, the door will excessively bend the boot encased portion of the cable when it is closed.

Right angle boots are typically more rigid than the typical straight boot.

Thus, a need exists for a guide boot that can receive a fiber optic cable or ribbon and circumferentially rotate or twist the cable and insure that the cable will not be excessively bent. Additionally, such a guide needs to be removably installable.

SUMMARY OF THE INVENTION

The present invention is directed to a single-piece guide boot for a fiber optic ribbon cable. The guide boot comprises an outer sleeve or body that defines an inner passageway, and at one end has a termination plug with termination port for receiving the cable. The inner passageway is dimensioned to allow a user to insert a cable through the passageway. The body with the inner passageway is used for guiding the cable while also allowing the cable to bend and to twist. The body is angled at the desired angle (ensuring a satisfactory radius of curvature), such as about 45 degrees or about 90 degrees. The body could have an outer diameter that decreases toward the first end. The inner passageway could be round in cross-section and tapered along its length. Preferably, the cable is inserted into and through the guide boot with twisting or rotation, with the cable thereafter prevented from further twisting or rotation in the guide boot.

The foregoing and other aspects of the present invention will become apparent from the following detailed description of the invention when considered in conjunction with the accompanying drawings.

DESCRIPTION OF EXEMPLARY EMBODIMENTS AND BEST MODE

Figure 1:
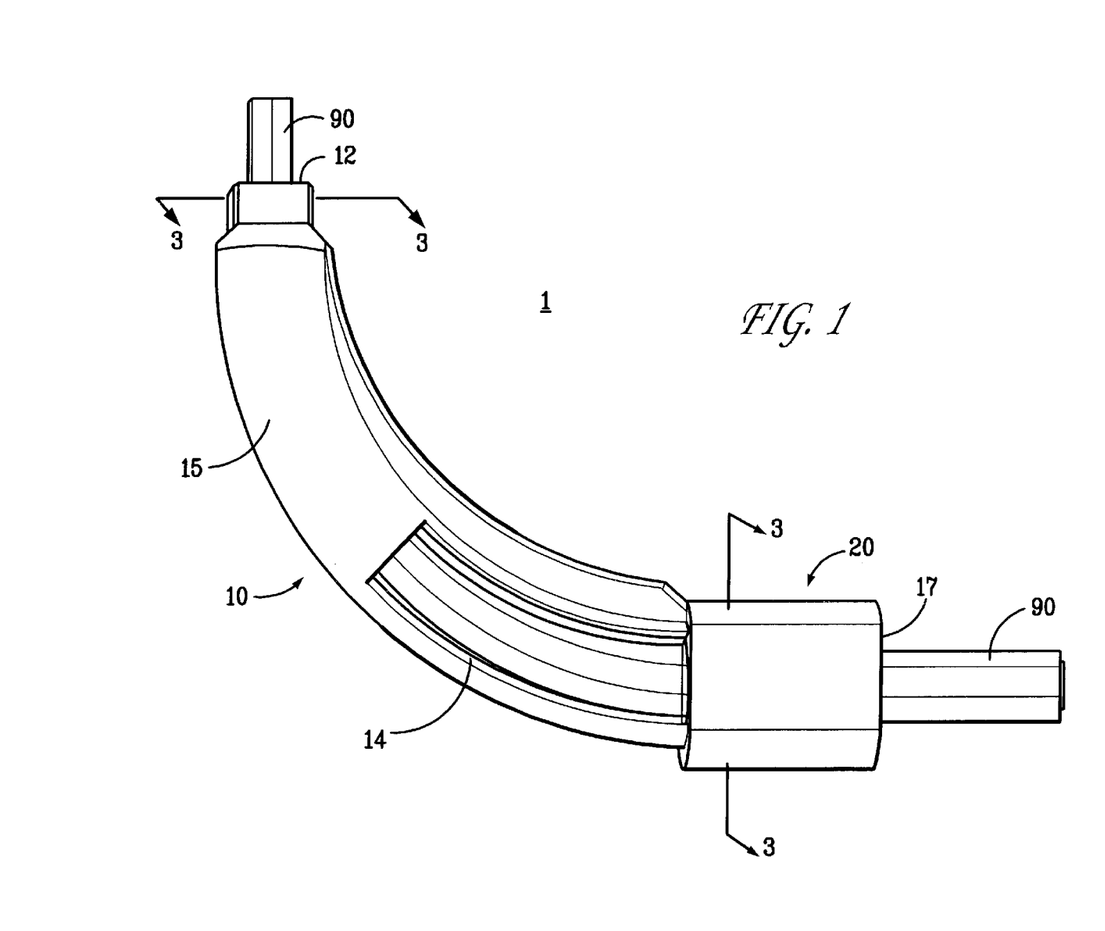
FIG. 1 is a perspective view of an exemplary guide boot with received cable in accordance with the present invention.

FIG. 1 is a perspective view of an exemplary one-piece guide boot assembly 1 with an angled section 10 and a straight section 20 (also referred to herein as the termination plug). A fiber optic cable 90 is shown extending through the angled section 10 and the straight section 20 of the guide boot assembly 1.

The construction and design of fiber optic cable is known. Fiber optic cables may consist of a pair (or more) of thin channels or optic fibers formed of glass. The thin glass fibers are typically coated with ultraviolet-curable material for protection. The coated fibers are then covered with a thermoplastic material having sufficient stiffness to preclude fiber buckling. Strength yarns or other suitable strength members surround the coated and covered fibers to withstand tensile forces, which can be caused by pulling on the fiber optic cable, which could otherwise break the fibers. An outer jacket, which may be made of polyvinyl chloride, surrounds the coated and covered fibers and the strength yarns. The fiber optic cable 90 can be a fiber optic ribbon cable that is flexible, bendable, and twistable. As described earlier, the bend and twist of the cable must be controlled to limit signal loss.

The guide boot 1 comprises an outer sleeve or body 15 that defines an inner passageway, and has a first end 12 for receiving the cable 90 and a termination port 17 through which cable 90 extends. The inner passageway is dimensioned to allow a user to insert a cable through the passageway. The angled section 10 of body 15 that defines the inner passageway is used for guiding, bending, and/or twisting (if desired) the cable 90. The body 15 is angled at a desired angle (ensuring a satisfactory radius of curvature), such as about 45 degrees or about 90 degrees, though any angle can be used as long as it does not affect the signal transmission of the cable 90. The body 15 could have an outer diameter that decreases toward the first end 12. The curved body 15 could be molded from a suitable non-flammable elastic material such as plastic.

Figure 2:
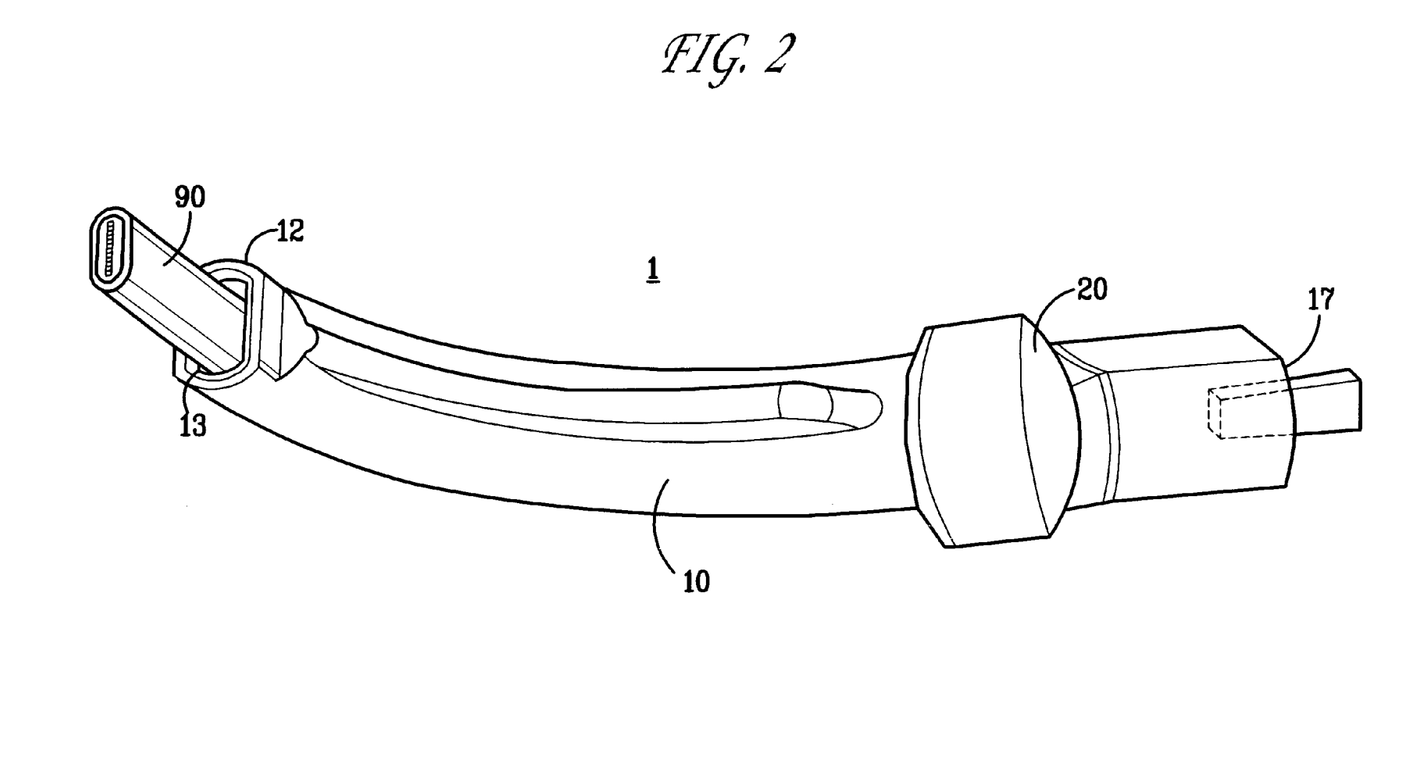
FIG. 2 is another perspective view of an exemplary guide boot with received cable in accordance with the present invention.

FIG. 2 is another perspective view of a guide boot assembly 1 with cable 90 extending there through. The first end 12 of the guide boot assembly 1 has an opening 13 shaped similarly to the shape of cable 90 extending through the passageway. The opening 13 could be rectangular or oval shaped and slightly larger than cable 90. The termination port 17 of the straight section (termination plug) 20 has an opening 18 (see FIG. 4) that could be shaped similarly to the shape of cable 90, but may be any shape that does not interfere with the ability of cable 90 to twist within the boot. The exterior of the termination port 17 can be any shape, such as an oval shape, or round with an octagonal-shaped exterior, for example, and serves to prevent the guide boot 1 from rotating relative to the cable 90 after being secured to a portion of connector 100 (see FIG. 5), or connected with a panel or other device (not shown).

Figure 3:
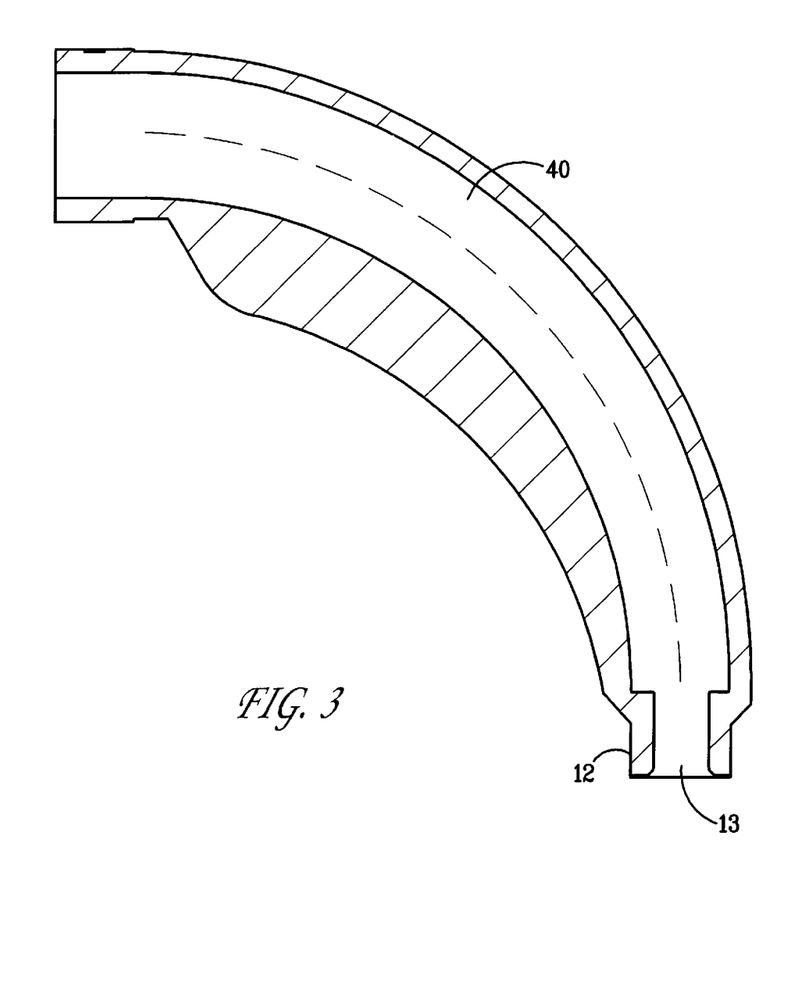
FIG. 3 is a section view taken along the line 3—3 in FIG. 1.
Figure 5:
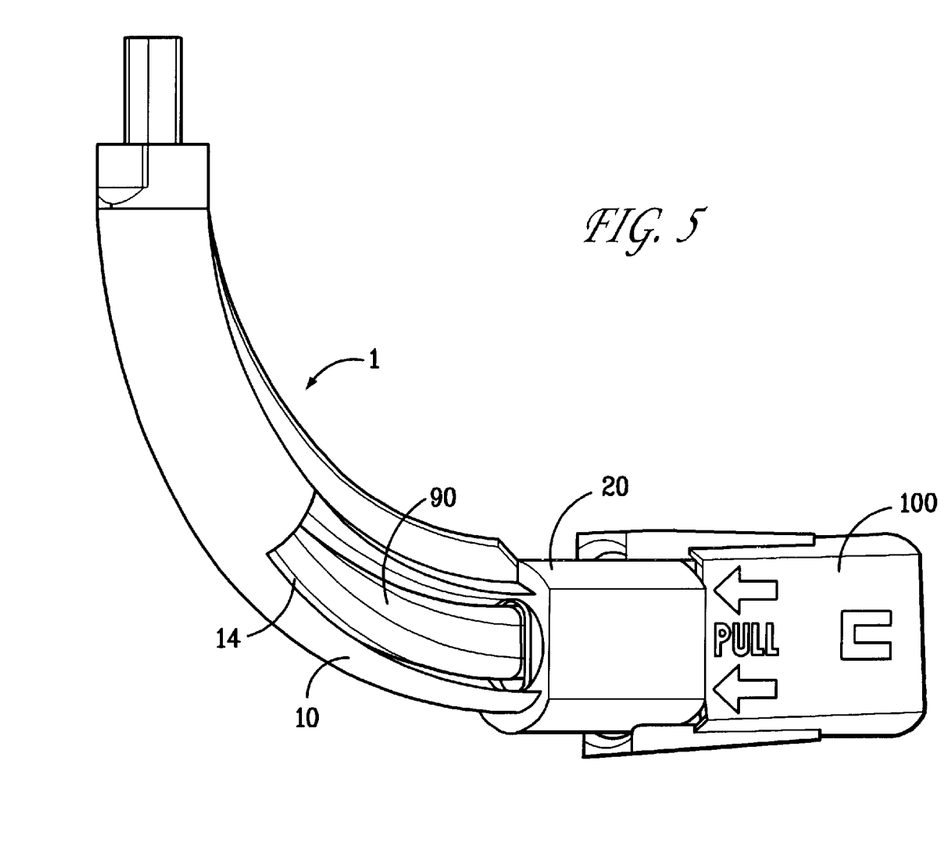
FIG. 5 is a perspective view of an exemplary guide boot, with received cable, inserted into a receptacle in accordance with the present invention.
Figure 6:
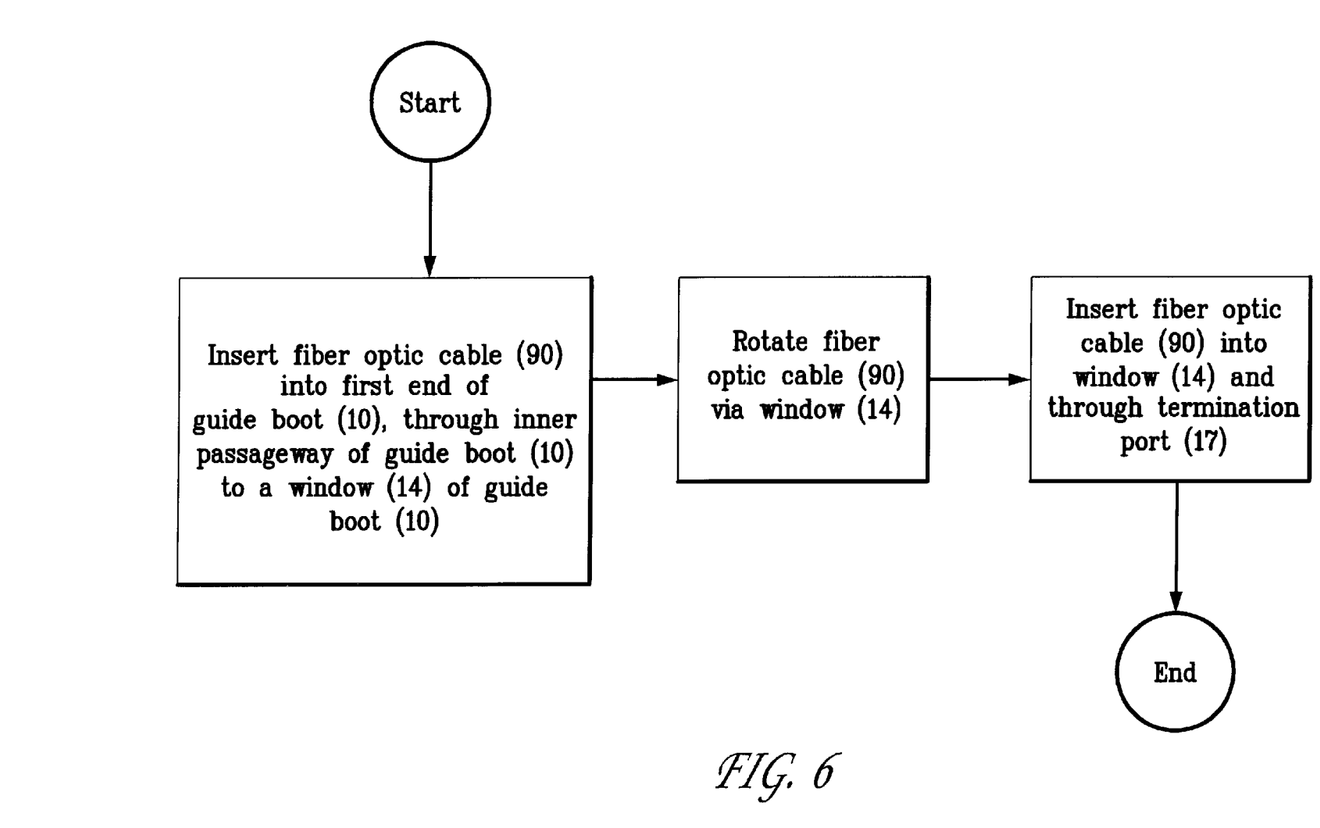
FIG. 6 is a flow diagram depicting a method for inserting a fiber optic cable into a guide boot in accordance with the present invention.

FIG. 3 is a section view of the angled section 10 taken along the line 3—3 in FIG. 1. As seen in FIG. 3, the inner passageway 40 could be tapered so as not to interfere with the twisting of cable 90. The cable 90 could be inserted into and through the guide boot 1 with twisting or other rotation (as shown in FIG. 5, for example). The guide boot 1 is then connected with a portion of a fiber optic connector 100, or connected with a panel or other device (not shown). In this manner, the cable 90 is provided to a connector, the panel or other device.

The fiber optic cable 90 could be twisted or rotated before exiting the one-piece boot 1. It is contemplated that the installer manually twists or rotates the cable. For example, the installer could insert the fiber through the first end of the boot 1, then out of a window in a portion of the angled section 10, such as window 14 in FIG. 5. Subsequently, the installer twists the cable, then reinserts the fiber into the window 14 and through the second end of the boot 1 out the termination port 17 of the termination plug 20. Finally, the boot 1 is placed over the end of the connector 100. In this manner, the cable 90 has a different orientation when inserted into the first end 12 and when exiting at the termination port 17.

Figure 4:
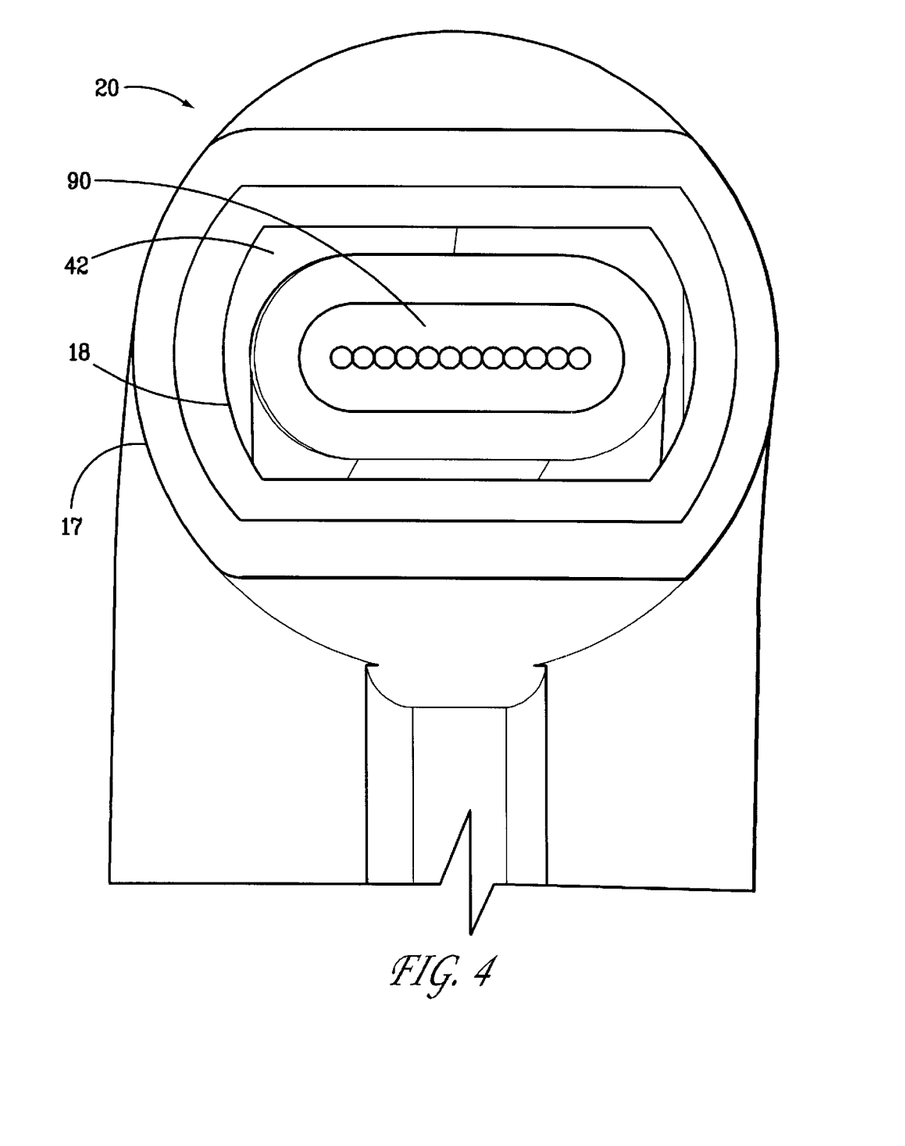
FIG. 4 is a front view of an exemplary termination end of a guide boot in accordance with the present invention.

FIG. 4 is a front view of an exemplary termination end of a guide boot in accordance with the present invention. The termination plug 20 has an end to receive the cable 90 within an inner passageway 42 and is fixably connected with the angled section 10 to form a one-piece boot. Alternately, the boot is formed so that the angled section 10 and the plug 20 are comprised within one integral part. The termination port 17 is shaped so that it is adapted to receive a portion of connector 100, or to connect with a connector panel or other device (not shown). In this manner, the cable 90 is provided to the connector, panel or other device. It is noted that passageway 42 is shaped similarly to the shape of cable 90. Similar to opening 13, passageway 42 has a shape and size to receive cable 90 and to receive a rear end of connector 100.

As noted above, the cable 90 extends through the guide boot 1 with the desired twisting or rotation. In other words, in such an embodiment, the cable 90 changes its orientation as it passes through the guide boot 1. Thereafter, the orientation is fixed and can no longer be changed, without removing and re-installing the cable. The termination port 17 prevents rotation, i.e., maintains orientation, of the cable. In this manner, the rotation is achieved and maintained by the relative orientation of opening 13 and passageway 42 due to their shapes corresponding to cable 90. Because the remainder of the inner passageway of the guide boot 10 is tapered, the cable 90 uses the entire length of first boot section 10 to rotate without interference. The termination port 17 can be used to fix rotation to any amount that the user desires.

It is contemplated that guide boot 1 can provide various angles of cable rotation such as −45 degrees, +45 degrees, or 90 degrees. In fact, boot 1 could secure to connector 100 without any rotation if the user does not desire any twist on the cable 90, and merely desires an angled boot assembly. In this manner, providing the cable at a circumferential angle is less complex because the cable can be inserted into the guide boot without any twisting.

FIG. 5 is a perspective view of an exemplary guide boot, having a cut-out window in which a cable 90 has been received, inserted into a receptacle in accordance with the present invention. As shown, the cable 90 has a twist. Desirably, the fiber optic cable in this case is twisted before exiting the one-piece boot 1. An exemplary method of cable assembly is now described with respect to FIG. 5. The fiber optic cable 90 is inserted through the angled section 10 and out the window 14. The cable 90 is then twisted the desired amount, and then is reinserted back into the window 14. For example, after inserting the cable 90 through section 10 and out the window 14, the installer may rotate the end of the cable 90, and reinsert the cable 90 back into the window 14, and then through the plug 20. The cable 90 is then terminated to the connector 100 in a known manner. The plug 20 is then secured to the connector 100, preferably by receiving the rear end of the connector 100 within the passageway 42 of the plug 20. The one-piece boot 1 secures to the rear end of the fiber optic connector.

The window 14 may be positioned anywhere on the angled section 10 and can be any size (length and width), as long as it is large enough to receive the cable from the end 12 and provide the cable to the port 17. Instead of the cable 90 exiting the window 14 during the assembly process, it is contemplated that the cable 90 is twisted or rotated by an installer reaching through the window 14 to twist or rotate the cable 90 prior to passing the cable 90 through the plug 20.

Despite the presence of window 14, the internal passage maintains a continuous surface along the outer diameter of the bend section. This continuous surface helps guide the cable 90 through the bend.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. A one-piece guide boot assembly for use with a fiber optic cable, said boot assembly comprising:

a first section comprising:
a first end for receiving the fiber optic cable,
a body that defines an inner passageway for the fiber optic cable, and
a window disposed in the body for passing the fiber optic cable into and out of the first section; and a termination plug opposite the first end comprising a termination port from which the fiber optic cable extends.

2. The assembly of claim 1, wherein the termination plug is fixably connected to the first section.

3. The assembly of claim 1, wherein the first section is angled at a predetermined angle.

4. The assembly of claim 3, wherein the predetermined angle is one of about 45 degrees and about 90 degrees.

5. The assembly of claim 1, wherein the body has an outer diameter that decreases toward the first end.

6. The assembly of claim 1, wherein the first end of the first section is oval-shaped.

7. The assembly of claim 1, wherein the termination port has a round opening and an octagonal-shaped exterior.

8. The assembly of claim 1, wherein the inner passageway is circular.

9. A fiber optic cable assembly, comprising:
a connector;
a fiber optic cable terminating at said connector; and
a one-piece guide boot assembly for controlling said cable upon exiting from said connector, said boot assembly comprising:
a termination plug adjacent said connector;
a first end opposite said termination plug for receiving said cable;
a termination portion adjacent said termination plug and from which said cable extends; and
a body disposed between said first end and said termination portion and defining an inner passageway for said cable, the body comprising a window for passing the fiber optic cable into and out of the body.

10. The fiber optic cable assembly of claim 9, wherein the body is angled at a predetermined angle.

11. The fiber optic cable assembly of claim 10, wherein the predetermined angle is one of about 45 degrees and about 90 degrees.

12. The fiber optic cable assembly of claim 9, wherein the body has an outer diameter that decreases toward the first end.

13. A method of inserting a fiber optic cable into a connector comprising a guide boot having a first end and a termination port with a termination plug, comprising:
inserting the fiber optic cable into the first end of the guide boot, through an inner passageway of the guide boot, and out a window in the guide boot;
rotating the fiber optic cable; and
inserting the fiber optic cable into the window and through the termination port.

14. A method of inserting a fiber optic cable into a connector comprising a guide boot having a first end and a termination port with a termination plug, comprising:
inserting the fiber optic cable into the first end of the guide boot, through an inner passageway of the guide boot to a window in the guide boot;
rotating the fiber optic cable in the inner passageway via the window; and
inserting the fiber optic cable through the termination port.

15. A one-piece guide boot assembly for use with a fiber optic cable, said boot assembly comprising:
a first section comprising:
a first end for receiving the fiber optic cable,
a body that defines an inner passageway for the fiber optic cable, and
a window disposed in the body; and
a termination plug opposite the first end comprising a termination port from which the fiber optic cable extends, wherein the window comprises a window for passing the fiber optic cable out of the body, reinserting the fiber optic cable through the window, and inserting the fiber optic cable through the termination port.

16. A one-piece guide boot assembly for use with a fiber optic cable, said boot assembly comprising:
a first section comprising:
a first end for receiving the fiber optic cable and restraining a first portion of the fiber optic cable from twisting and rotating;
a body that defines an inner passageway for the fiber optic cable, and
a window disposed in the body and providing access to a second portion of the fiber optic cable so that the second portion can be twisted and rotated in relation to the first portion; and
a termination plug opposite the first end comprising a termination port from which the fiber optic cable extends.

17. The one-piece guide boot assembly of claim 16, wherein the window provides access to the termination plug so that the second portion can be inserted through the termination port to engage the termination plug after being twisted and rotated in relation to the first portion and the termination plug restrains the second portion from twisting and rotating in relation thereto.

18. A fiber optic cable assembly, comprising:
a connector;
a fiber optic cable terminating at said connector; and
a one-piece guide boot assembly for controlling said cable upon exiting from said connector, said boot assembly comprising:
a termination plug adjacent said connector;
a first end opposite said termination plug for receiving said cable;
a termination portion adjacent said termination plug and from which said cable extends; and
a body disposed between said first end and said termination portion and defining an inner passageway for said cable, the body comprising a window for passing the fiber optic cable out of the body, reinserting the fiber optic cable through the window, and inserting the fiber optic cable into the termination plug.

19. A fiber optic cable assembly, comprising:
a connector;
a fiber optic cable terminating at said connector; and
a one-piece guide boot assembly for controlling said cable upon exiting from said connector, said boot assembly comprising:

a termination plug adjacent said connector;

a first end opposite said termination plug for receiving said cable and restraining a first portion of the fiber optic cable from twisting and rotating;

a termination portion adjacent said termination plug and from which said cable extends; and a body disposed between said first end and said termination portion and defining an inner passageway for said cable, the body comprising a window providing access to a second portion of the fiber optic cable so that the second portion can be twisted and rotated in relation to the first portion.

20. The one-piece guide boot assembly of claim 19, wherein the window provides access to the termination plug so that the second portion can be inserted through the termination port to engage the termination plug after being twisted and rotated in relation to the first portion and the termination plug restrains the second portion from twisting and rotating in relation thereto.

* * * * *